United States Patent [19]
Ishikawa et al.

[11] Patent Number: 6,072,129
[45] Date of Patent: Jun. 6, 2000

[54] IMPACT DETECTING APPARATUS

[75] Inventors: Masanobu Ishikawa, Nagoya; Koji Ito, Aichi-ken; Soichiro Masuda, Toyota; Kazuya Tanaka, Nagoya, all of Japan

[73] Assignee: Aisin Seiki Kabushiki Kaisha, Aichen-ken, Japan

[21] Appl. No.: 09/199,407

[22] Filed: Nov. 25, 1998

[30] Foreign Application Priority Data

Nov. 25, 1997 [JP] Japan ................................ 9-323356

[51] Int. Cl.$^7$ .................................................. H01H 35/14
[52] U.S. Cl. .................................. 200/61.45 R; 200/61.5
[58] Field of Search ........................... 200/61.45 R, 61.5, 200/61.45 M, 61.48–61.51, 61.53

[56] References Cited

U.S. PATENT DOCUMENTS

| | | | |
|---|---|---|---|
| 2,415,086 | 2/1947 | Detwiler | 200/61.52 |
| 4,178,492 | 12/1979 | Roesch et al. | 200/61.45 R |
| 4,326,111 | 4/1982 | Jackman | 200/61.45 R |
| 4,533,801 | 8/1985 | Jackman et al. | 200/61.45 R |
| 4,618,746 | 10/1986 | Schwob et al. | 200/61.45 R X |
| 4,689,452 | 8/1987 | Quick | 200/80 R |
| 5,847,262 | 12/1998 | Ito et al. | 200/61.45 R X |

FOREIGN PATENT DOCUMENTS 1-42095  9/1989  Japan.

*Primary Examiner*—J. R. Scott
*Attorney, Agent, or Firm*—Burns, Doane, Swecker & Mathis, LLP

[57] ABSTRACT

An impact detecting apparatus includes a housing, a fixed electrode located within the housing, a movable electrode located adjacent the fixed electrode and adapted to be electrically connected with the fixed electrode, and a conical slope located within the housing. The conical slope has varying gradients or slopes along the circumferential direction of the conical slope for providing varying sensitivity. A ball is also located on the conical slope, and a shaft is located within the housing. The shaft is movably supported on the housing for engaging the ball and is adapted to control the position of the movable electrode.

13 Claims, 11 Drawing Sheets

IMPACT DETECTING APPARATUS

This application corresponds to and claims priority under 35 U.S.C. § 119 with respect to Japanese Application No. 09(1997)-323356 filed on Nov. 25, 1997, the entire content of which is incorporated herein by reference.

FIELD OF THE INVENTION

The present invention generally relates to an impact detecting apparatus. More particularly, the present invention pertains to an impact detecting apparatus used in a vehicle safety system such as a fuel cutoff device, an air bag or a seat belt tensioner.

BACKGROUND OF THE INVENTION

A known impact detecting apparatus used in a vehicle is disclosed in U.S. Pat. No. 4,533,801. This impact detecting apparatus includes a housing possessing a conical slope, a ball located on the conical slope, a pair of fixed electrodes made of elastic material, and a movable conductor located between the fixed electrodes to provide connection to an electric power source. The movable conductor is capable of being bent by an external force so that the electric power is disconnected. In this apparatus, when an impact greater than a predetermined value is applied, the ball moves on the conical slope and bumps into the movable conductor to cause the movable conductor to bend. When the electric power is disconnected, the impact detecting apparatus outputs an impact signal.

However, in this apparatus, the conical slope in the housing is inclined at the same angle in all directions of the conical slope and so movement of the ball occurs regardless of the impacting direction. Therefore, the sensitivity of the apparatus does not vary in proportion to the impacting direction. It is thus difficult to adjust the sensitivity of the apparatus based on the vehicle frame structure upon collisions from different directions of the vehicle.

In light of the foregoing, a need exists for an impact detecting apparatus that is not susceptible to the same drawbacks and disadvantages discussed above.

It would be desirable to provide an impact detecting apparatus that allows the sensitivity of the apparatus to be selectively set or predetermined.

SUMMARY OF THE INVENTION

In accordance with one aspect of the present invention, an impact detecting apparatus includes a housing, a fixed electrode located within the housing, a movable electrode located adjacent the fixed electrode and adapted to be electrically connected with the fixed electrode, and a conical slope located within the housing. The conical slope has varying gradients or slopes along the circumferential direction of the conical slope. A ball is also located on the conical slope, and a shaft is located within the housing. The shaft is movably supported on the housing for engaging the ball and is adapted to control the position of the movable electrode.

According to another aspect of the invention, an impact detecting apparatus includes a housing having a sloping wall, a fixed electrode located within the housing, and a movable electrode positioned within the housing and adapted to be moved into and out of electrical engagement with the fixed electrode. A ball is located in the housing and is movable along the sloping wall, and a shaft is movably supported in the housing and operatively associated with the movable electrode for engaging the ball and controlling a position of the movable electrode. The sloping wall is angled at different gradients at different locations around the circumferential extent of the sloping wall.

In accordance with another aspect of the invention, an impact detecting apparatus includes a housing having a sloping wall, a ball located within the housing for movement along the sloping wall, a fixed electrode located within the housing, and a movable electrode positioned within the housing and adapted to be moved into and out of electrical engagement with the fixed electrode. A lever is mounted in the housing and operatively associated with the movable electrode for movement between a first position in which the movable electrode is moved into engagement with the fixed electrode and a second position in which the movable electrode is moved out of engagement with the fixed electrode. A shaft is movably supported in the housing and has a flange which is adapted to engage the lever to cause the lever to move to the second position. A spring is operatively associated with the shaft for urging the shaft towards the sloping wall. The shaft is adapted to engage the ball to position the lever in the first position, and with the ball being released from engagement with the shaft upon application of an impact to cause the flange on the shaft to engage the lever and move the lever to the second position. The flange and the lever are spaced apart from one another by a distance when the shaft engages the ball.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
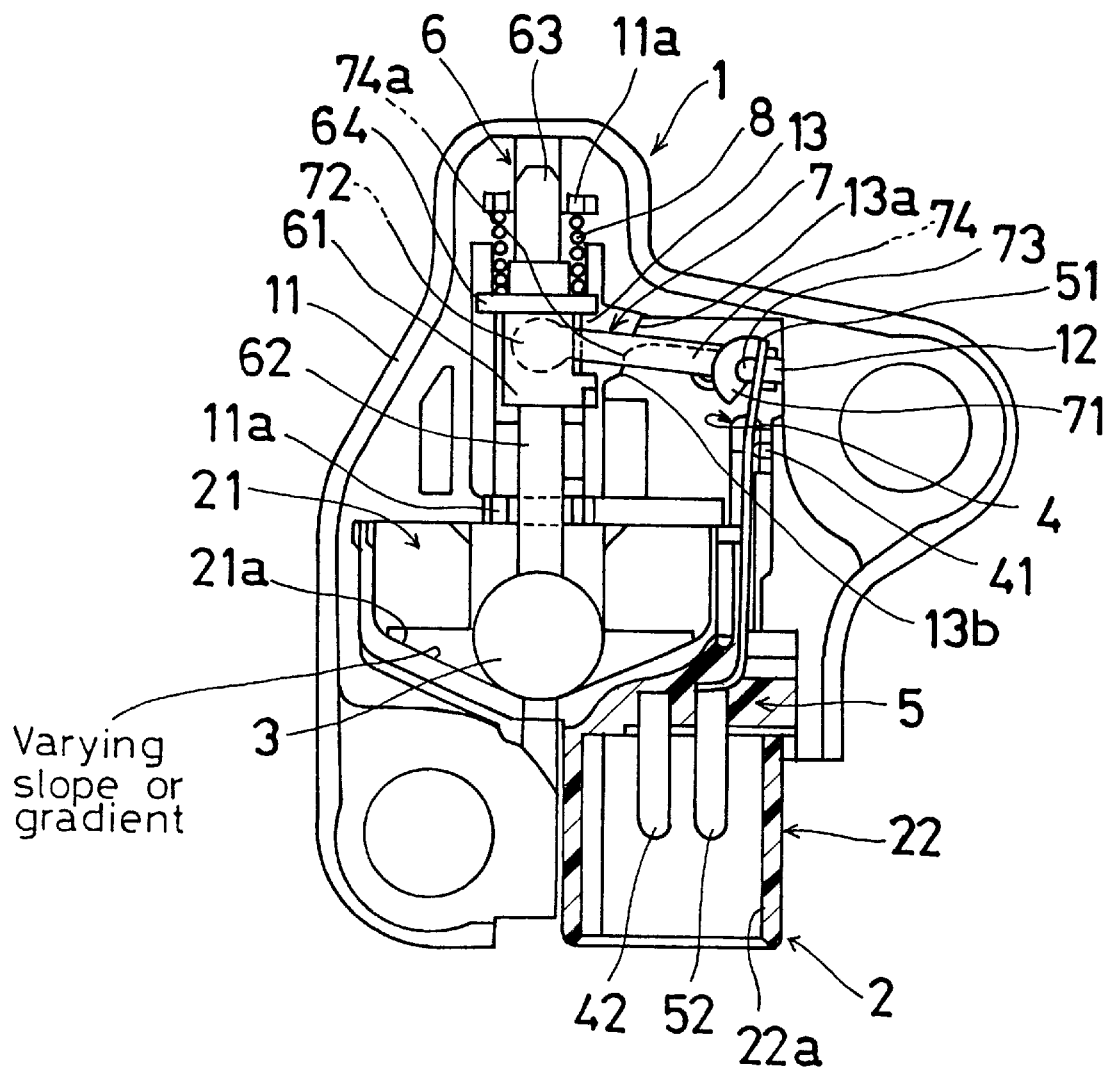
FIG. 1 is an elevational view, partially in section, of a first embodiment of an impact detecting apparatus in accordance with the prevent invention.

The impact detecting apparatus of the present invention will be described below in the context of being installed in a vehicle to detect the occurrence of a vehicle collision.

Referring initially to FIGS. 1–14, one embodiment of the impact detecting apparatus according to the present invention includes a housing 1 and a connector member 2 disposed within the housing 1. The housing 1 is comprised of a case 11 and a cover 16 which is best seen in FIG. 9. The connector member 2 includes a concavity portion or recessed portion 21 and a connector 22 that is exposed outside the housing 1. The bottom of the recessed portion 21 possesses a conical slope or conically sloping wall 21a. The connector 22 is also provided with a fixed electrode 4 and a movable electrode 5.

A ball 3 is disposed within the recessed portion 21 and is able to move along the conical slope 21a. In the state shown in FIG. 1, the ball 3 is held at the bottom of the conical slope 21a by one end of a shaft member 6.

The fixed electrode 4 is fixed on the connector 22. One end of the fixed electrode 4 is disposed within the housing 1 and comprises a contact point 41. The other end of the fixed electrode 4 is disposed within an outward facing opening 22a in the connector 22 and comprises a terminal 42.

The movable electrode 5 is also fixed on the connector 22. One end of the movable electrode 5 is disposed within the housing 1 and comprises a contact point 51 which is able to contact the contact point 41. The other end of the movable electrode 5 is also disposed within the outward facing opening 22a of the connector 22 and comprises a terminal 52. The contact point 41 of the fixed electrode 4 faces the contact point 51 of the movable electrode so that the two contact points 41, 51 are located in opposing relation to each other. A lever member 7 is located within the casing 11 and is adapted to push against the movable electrode. When the lever member 7 pushes the movable electrode 5, the contact point 51 of the movable electrode 5 is able to contact the contact point 41 of the fixed electrode 4. This causes electric current to flow between the fixed electrode 4 and the movable electrode 5.

The shaft member 6 is supported by a pair of bearing parts 11a of the case 11 and the cover 16 as shown in FIG. 1 and FIG. 9. The shaft member 6 is thus able to move in the axial direction. The shaft member 6 includes a rectangular portion or enlarged shaft portion 61, a first shaft portion 62 which extends towards the apex of the conical slope 21a of the recessed portion 21 of the connector member 2, a second shaft portion 63 which extends in the opposite direction of the first shaft portion 62, and a flange 64 located between the rectangular portion 61 and the second shaft portion 63. The shaft member 6 is axially movable positioned within the housing 1 when the ball 3 is moved out of engagement with the end of the first shaft portion 62. Upon movement of the shaft member 6 in the downward direction, the lever member 7 is caused to rotate.

A coil spring 8 is located around or encircles the second shaft portion 63. One end of the coil spring 8 is supported by the bearing part 11a while the opposite end of the coil spring 8 is supported by the flange 64. The spring 8 applies a biasing force to shaft member 6 so that the shaft member 6 is pushed downward toward the apex of the conical slope 21a of the concavity portion 21.

The lever member 7 includes a pushing portion 71 located at one end of the lever member 7 for pushing or contacting the contact point 51 of the movable electrode 5 and a connecting portion 72 located at the opposite end of the lever member 7. The connecting portion 72 is adapted to engage the rectangular portion 61 of the shaft member 6 at a location below the flange 64 as seen in FIG. 9. The lever member 7 also includes a pair of spindle portions 73 located on the pushing portion 71 and extending perpendicular to the lengthwise direction of the lever member 7, and a long and narrow projection 74 located on the side surface of the lever member 7. The one end of the projection 74 located near the connection portion 72 tapers to a contact surface portion 74a.

The case 11 is provided with a slit 12 and the cover 16 is provided with a similar slit. The slits extend in the direction in which the contact point 51 moves to effect disengagement from the contact point 41 of the fixed electrode 4. The slits 12 in the case and the cover receive the spindle portions 73. The lever member 7 is thus able to slide along the slits 12 and rotate around the spindle portions 73.

Figure 5:
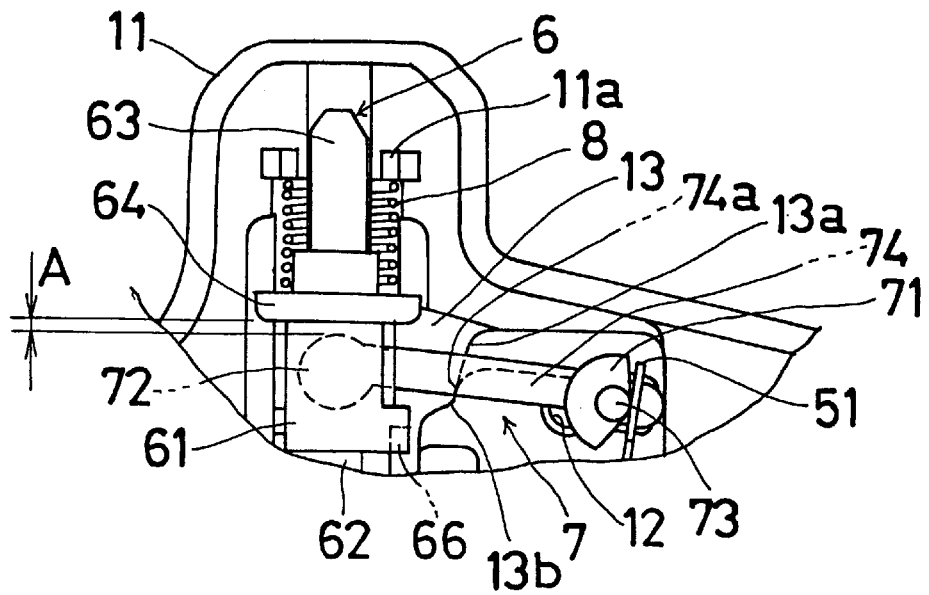
FIG. 5 is an enlarged elevational view of a portion of the impact detecting apparatus shown in FIG. 1.

As shown in FIG. 1 and FIG. 5, the case 11 of the housing 1 has a projected wall 13. The projected wall 13 opposes the contact surface portion 74a of the projection 74 of the lever member 7. The projected wall 13 includes a contact surface 13a that is adapted to contact the contact surface portion 74a of the projection 74 of the lever member 7. The lever member 7 is held at an initial position where the contact surface portion 74a of the lever member 7 contacts the contact surface 13a of the projected wall 13, and where the connecting portion 72 of the lever member 7 pushes the contact point 51 of the movable electrode 5 towards the contact point 41 of the fixed electrode 4. The contact surface portion 74a of the lever member 7 slides on the contact surface 13a of the projected wall 13 when the shaft member 6 moves axially downward towards the apex of the conical slope 21a. One end of the contact surface 13a has a small knoll or ridge 13b which is shown in FIG. 5. When the contact surface 74a of the lever 7 engages the small ridge 13b, the resistance force increases and this resistance force resists the rotation of the lever member 7. The resistance force is less than the force of the coil spring 8.

Figure 11:
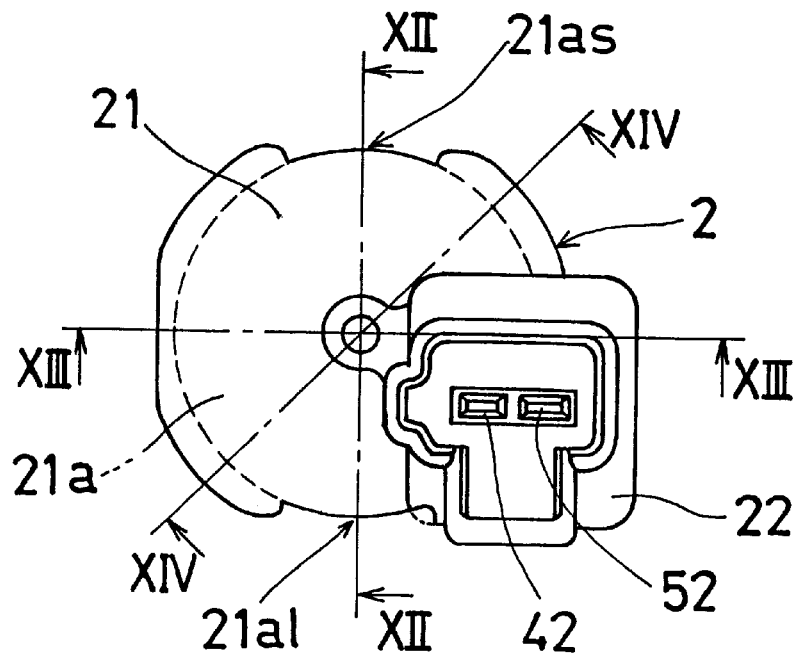
FIG. 11 is an end view of the impact detecting apparatus shown in FIG. 1 illustrating the conical slope in the housing.
Figure 12:
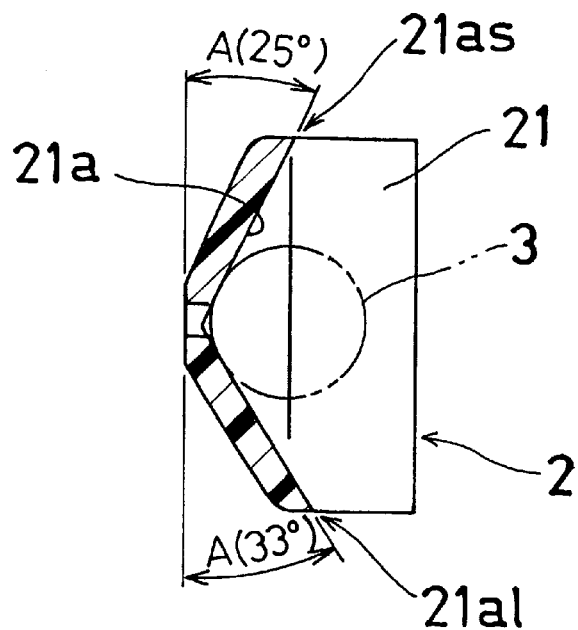
FIG. 12 is a cross-sectional view taken along the section line XII—XII in FIG. 11.
Figure 13:
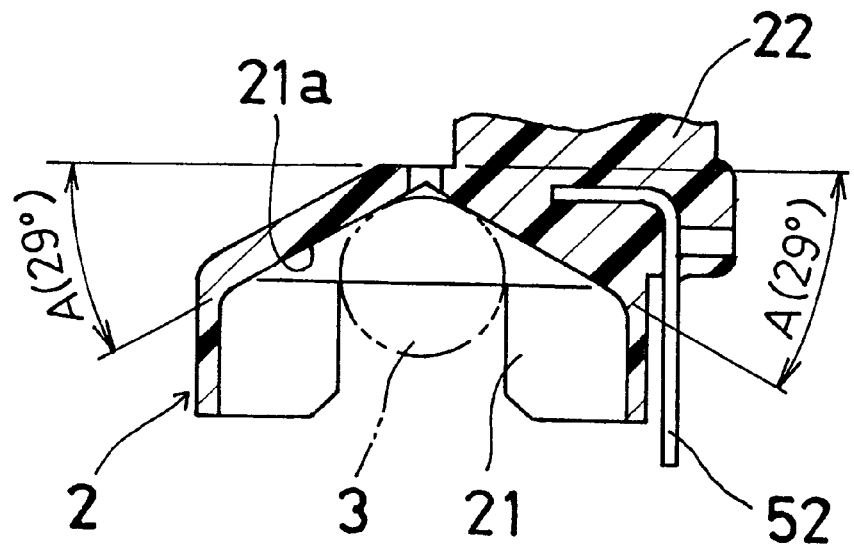
FIG. 13 is a cross-sectional view taken along the section line XIII—XIII in FIG. 11.
Figure 14:
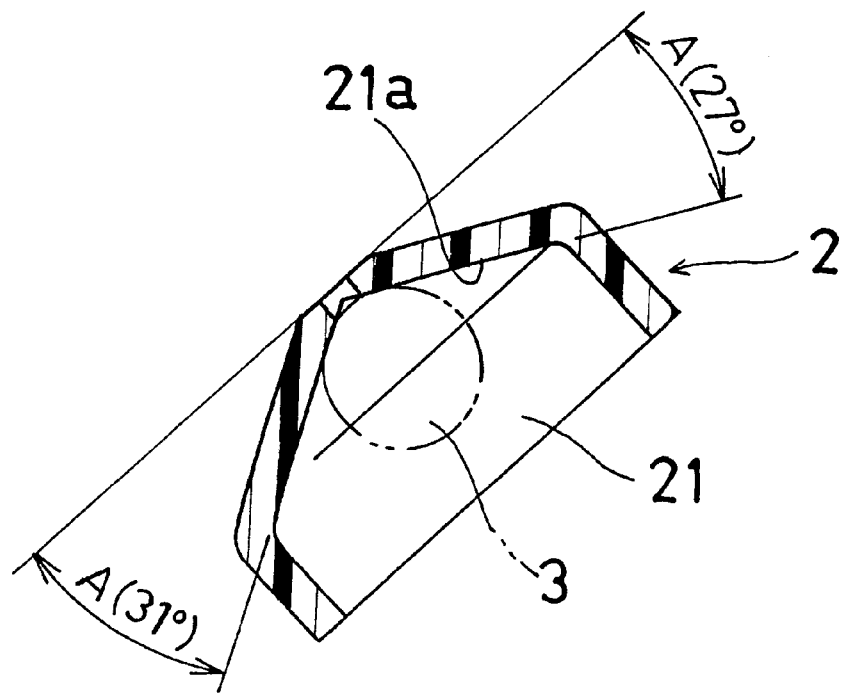
FIG. 14 is a cross-sectional view taken along the section line XIV—XIV in FIG. 11.

Referring to FIG. 11 to FIG. 14, the conical slope 21a of the recessed portion 21 has continuous various gradients or a continuously varying slope along the circumferential direction. As shown in FIG. 12, in this embodiment, the smallest angle B of the gradient or slope is approximately 25 degrees from the vertical, and the largest angle B of the gradient is approximately 33 degrees from the vertical. The smallest angle portion $21_{as}$ and the largest angle portion $21_{al}$ are located on diametrically opposite faces to each other as shown in FIG. 12. The angle B of the gradient gradually increases from the smallest angle portion $21_{as}$ to the largest angle portion $21_{al}$ in the same ratio (i.e., at the same rate) extending circumferentially about the sloping wall in both directions (i.e., the clockwise and counterclockwise directions). Thus, the conical slope 21a of the recessed portion 21 possesses a plurality of different slopes or gradients at different spaced apart places along the circumference of the conical slope.

The operation of the impact detecting apparatus of the present invention is as follows. Referring to FIG. 1 and FIG.

5, the impact detecting apparatus is in the first non-operation stage in which no impact has occurred. As the first stage, the ball 3 is located at the bottom of the conical slope 21a of the recessed portion 21. The tip of the first shaft portion 62 of the shaft member 6 pushes on the outer surface of the ball 3. In this position, the lever 7 is positioned such that the contact surface 74a of the projection 74 of the lever 7 is in contact with the contact surface 13a of the projected wall 13 at the foot of the ridge 13b. Therefore, the contact between the contact surface 13a of the projected wall 13 and the contact surface 74a of the lever 7 resists the sliding movement of the lever member 7. At this time, the pushing portion 71 of the lever member 7 pushes the contact point 51 of the movable electrode 5 into contact with the contact point 41 of the fixed electrode 4 to effect electrical connection between the contact point 51 of the movable electrode 5 and the contact point 41 of the fixed electrode 4. In this state, a clearance A exists between the shaft member 6 (i.e., the flange 64) and the lever member 7 as shown in FIG. 5. Therefore, the resistance force from the flexure of the movable electrode 5 is not transmitted to the shaft member 6 through the lever member 7.

Figure 2:
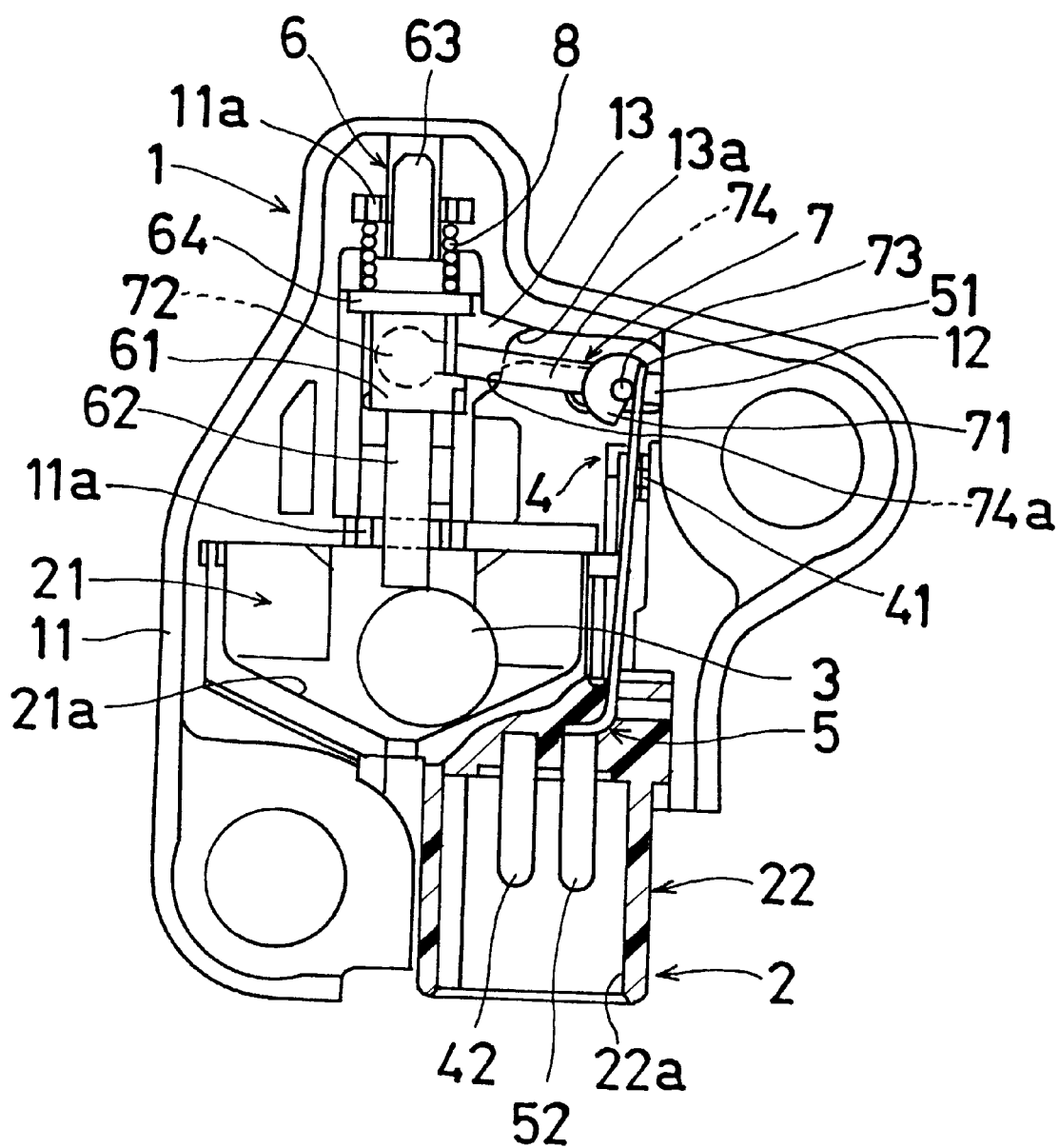
FIG. 2 is an elevational view, partially in section, showing the operation of the impact detecting apparatus illustrated in FIG. 1.
Figure 3:
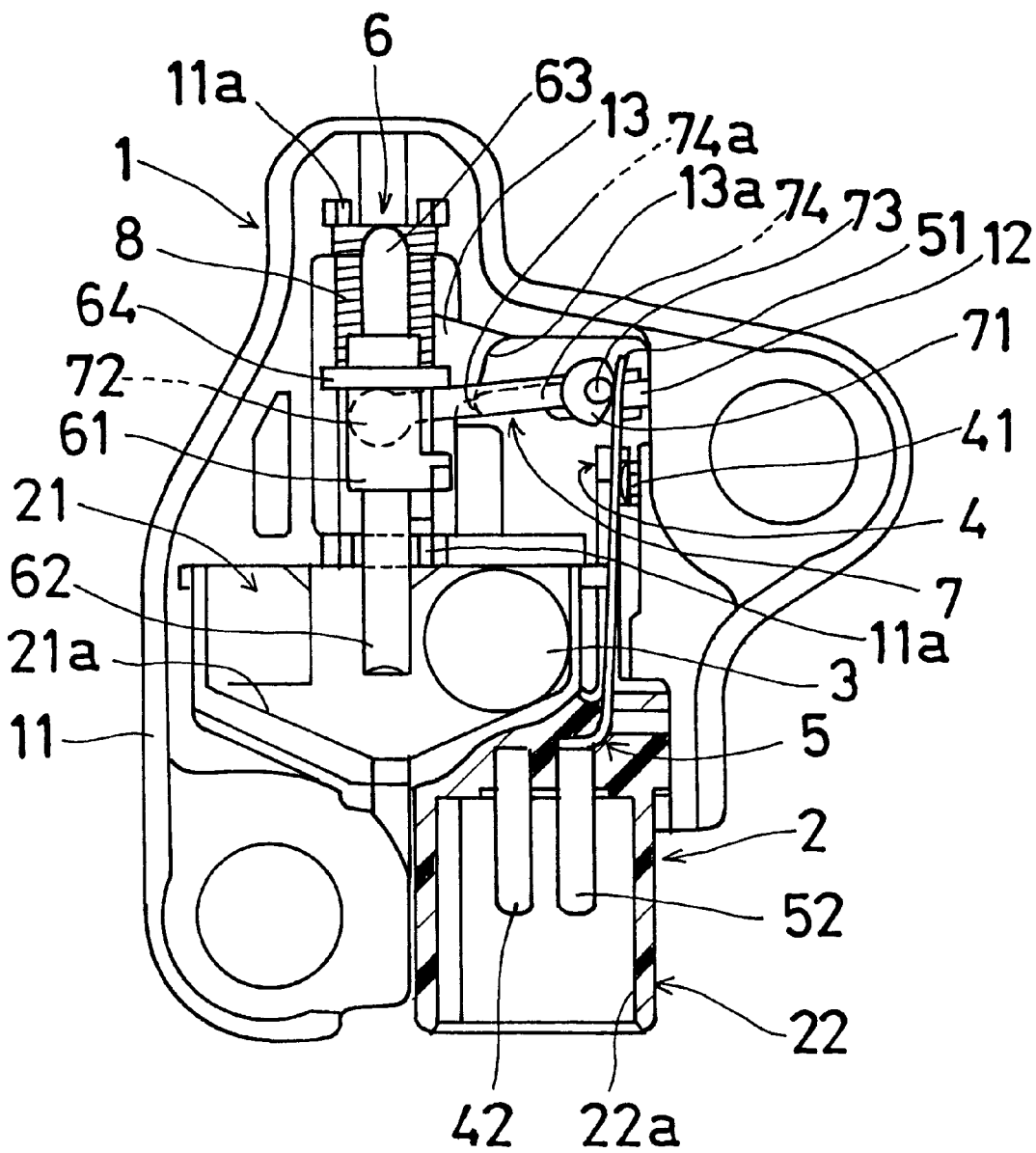
FIG. 3 is an elevational view, partially in section, showing the operation of the impact detecting apparatus illustrated in FIG. 1.
Figure 4:
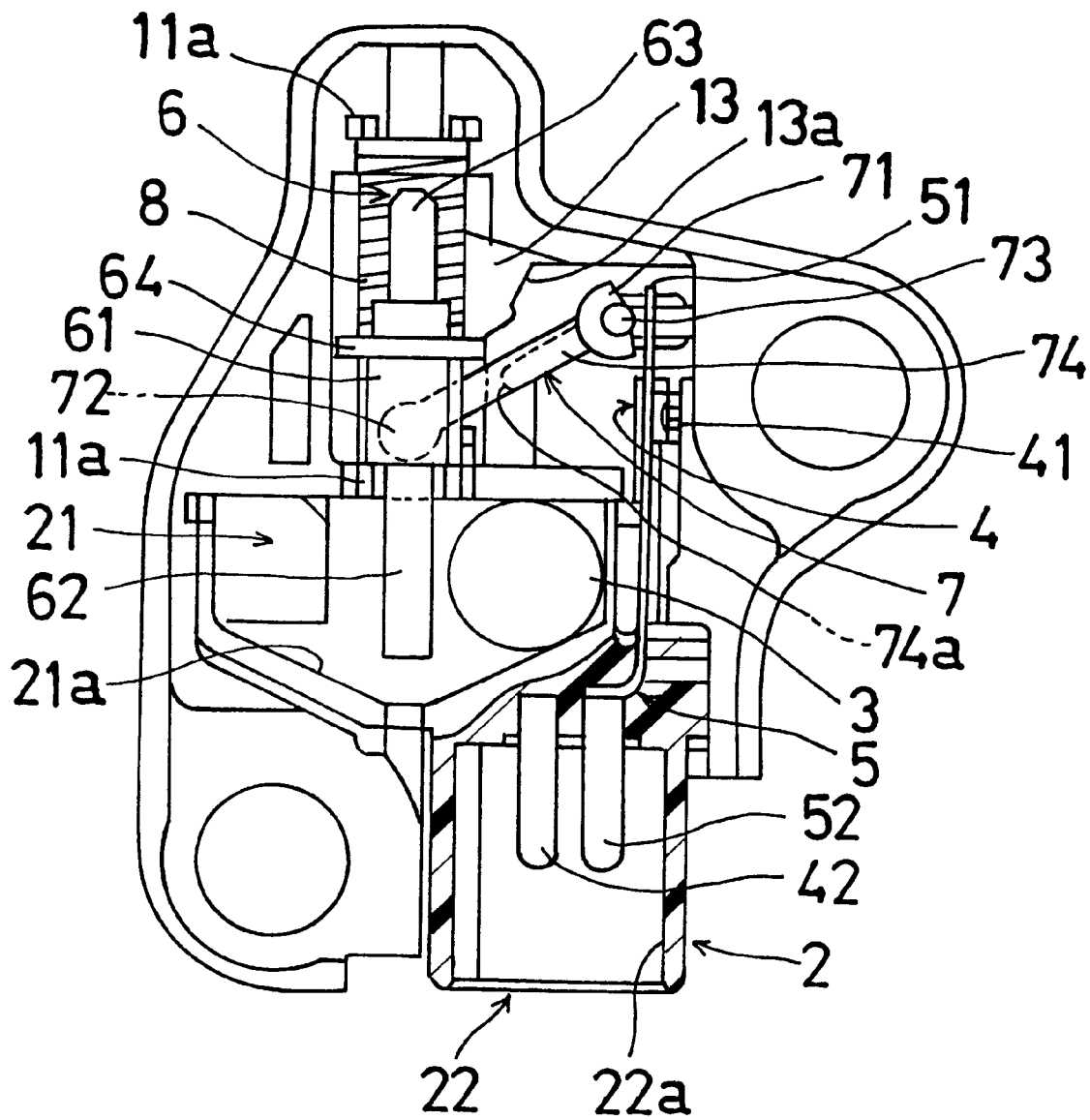
FIG. 4 is an elevational view, partially in section, showing the operation of the impact detecting apparatus illustrated in FIG. 1.
Figure 6:
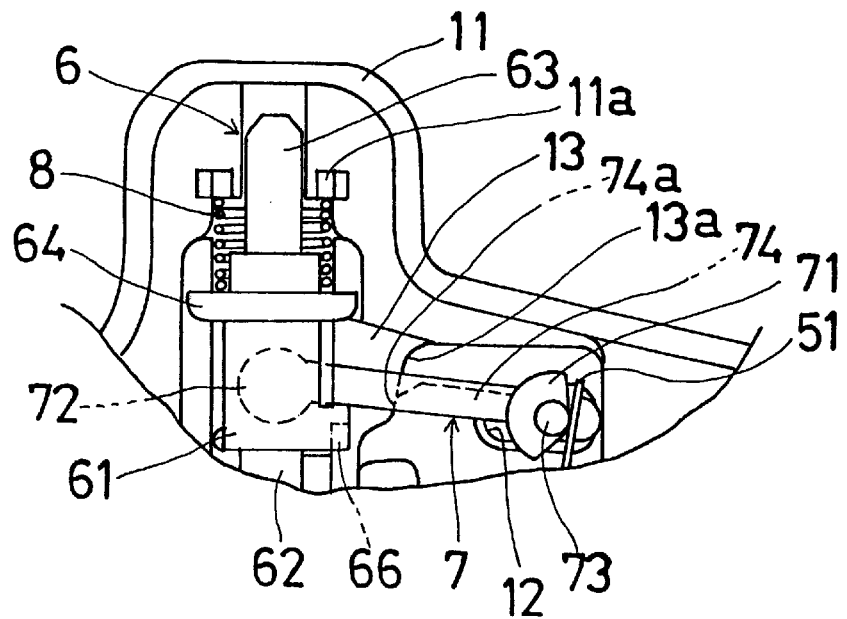
FIG. 6 is an enlarged elevational view of a portion of the impact detecting apparatus shown in FIG. 2.
Figure 7:
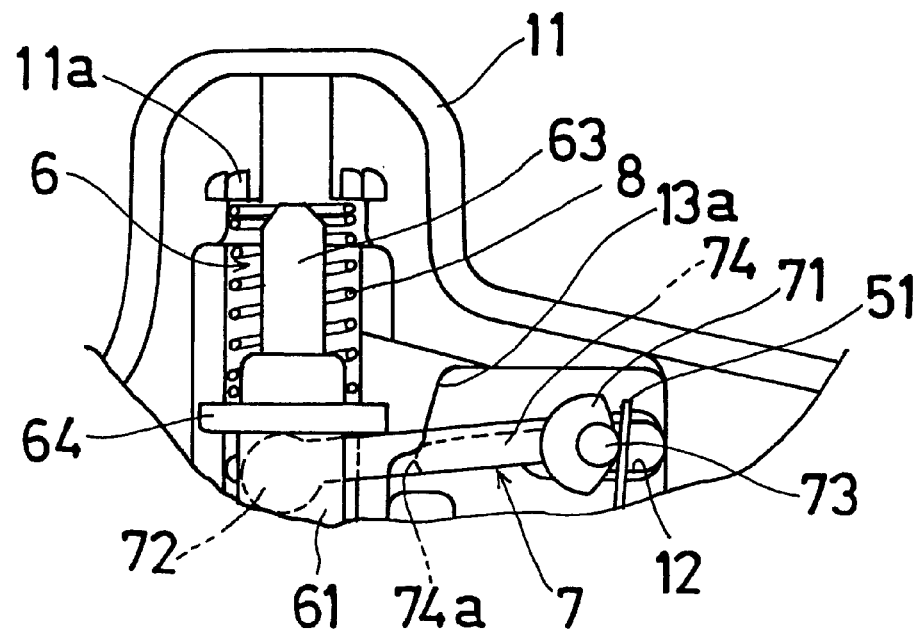
FIG. 7 is an enlarged elevational view of a portion of the impact detecting apparatus shown in FIG. 3.

When an impact greater than a predetermined value is applied to or experienced by the apparatus, the tip of the first portion 62 of the shaft member 6 comes out of engagement with the surface of the ball 3. The ball 3 thus moves along the conical slope 21. When the tip of the first portion 62 of the shaft member 6 comes out of engagement with the surface of the ball 3, the ball 3 lifts the shaft member 6 against the urging force of the coil spring 8 as shown in FIG. 2 and FIG. 6. After that, the coil spring 8 moves the shaft member 6 downwardly as shown in FIG. 3 and FIG. 7. Therefore, the flange 64 of the shaft member 6 contacts the connecting portion 72 of the lever member 7, and rotates the lever member 7 to a second position. As the lever member 7 rotates, the contact surface 74a of the projection 74 of the lever member 7 is released from the contact surface 13a of the projected wall 13 and the resistance force from the flexure of the movable electrode 5 causes the lever member 7 to slide along the slits 12 in the leftward direction as seen with reference to FIG. 3. Therefore, the pushing portion 71 of the lever 7 releases the contact point 51 of the movable electrode 5. As a result, electric current between the fixed electrode 4 and the movable electrode 5 is cut off, and the impact detecting apparatus outputs an impact signal. Thus, according to the present invention, the lever 7 is movable between a first position in which the movable electrode 5 is moved into engagement with the fixed electrode 4 and a second position in which the movable electrode 5 is moved out of engagement with the fixed electrode 4.

As noted above, in the initial or first stage shown in FIG. 1, the resistance force from the flexure of the movable electrode 5 is received by the lever member 7. However, there exists a clearance A between the shaft member 6 and the lever member 7 as shown in FIG. 5. Therefore, the resistance force from the flexure of the movable electrode 5 does not act on the shaft member 6. As the result, even if the resistance force from the flexure of the movable electrode 5 is made larger or increased to make the switching performance between the fixed electrode 4 and the movable electrode 5 more sensitive, the pushing force applied by the coil spring 8 to the ball 3 is not influenced. That is, the resistance force from the flexure of the movable electrode 5 does not act on or have an affect on the sensitivity of the apparatus in detecting an impact. The resistance force associated with the flexure of the movable electrode 5 can thus be increased without adversely affecting the sensitivity of the impact detecting apparatus.

Figure 8:
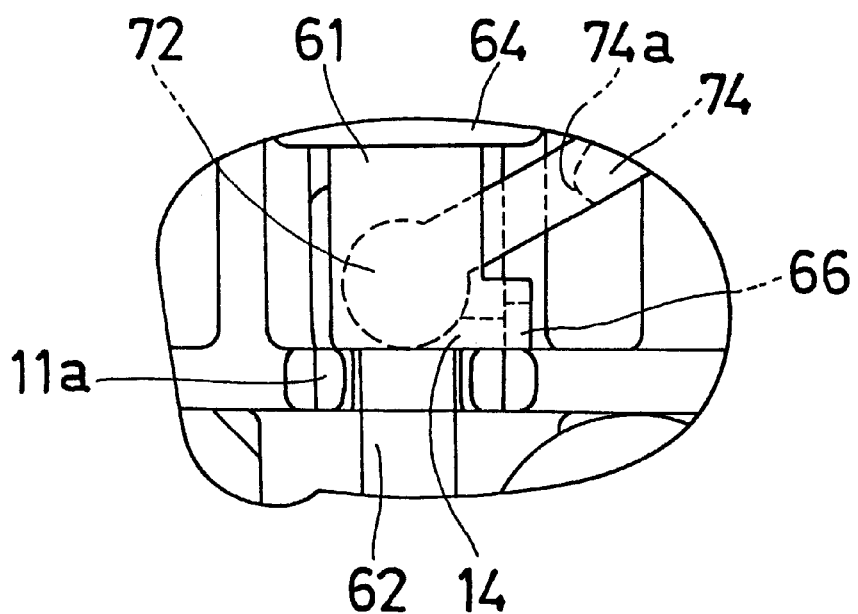
FIG. 8 is an enlarged elevational view of a portion of the impact detecting apparatus shown in FIG. 4.
Figure 9:
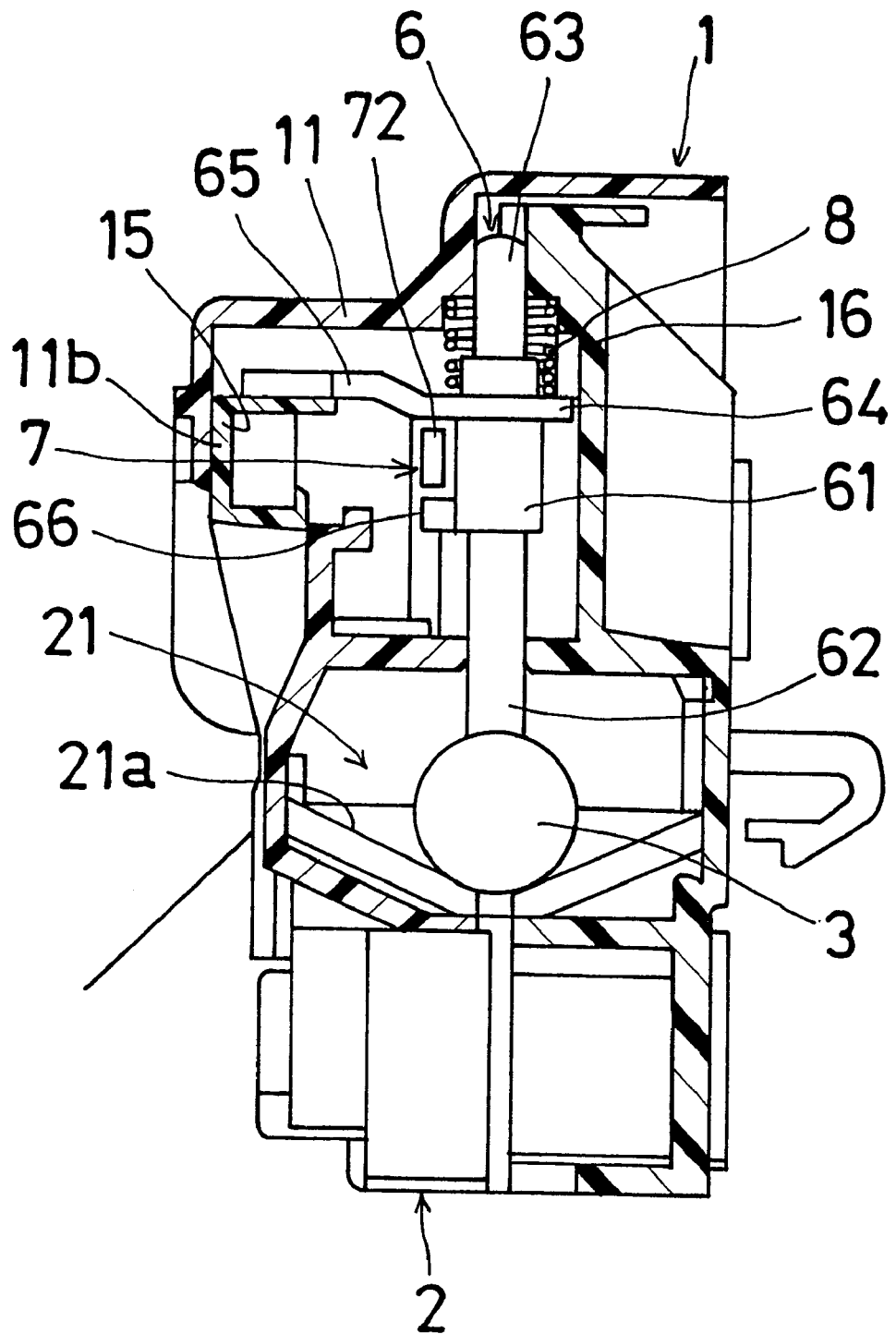
FIG. 9 is a cross-sectional view of the impact detecting apparatus illustrated in FIG. 1.

Referring to FIG. 8, the case 11 of the housing 1 includes a guide wall 14 which is able to contact the connecting portion 72 of the lever member 7. The guide wall 14 pulls the connecting portion 72 to disengage the lever member 7 from the movable electrode under the state shown in FIG. 4.

Figure 10:
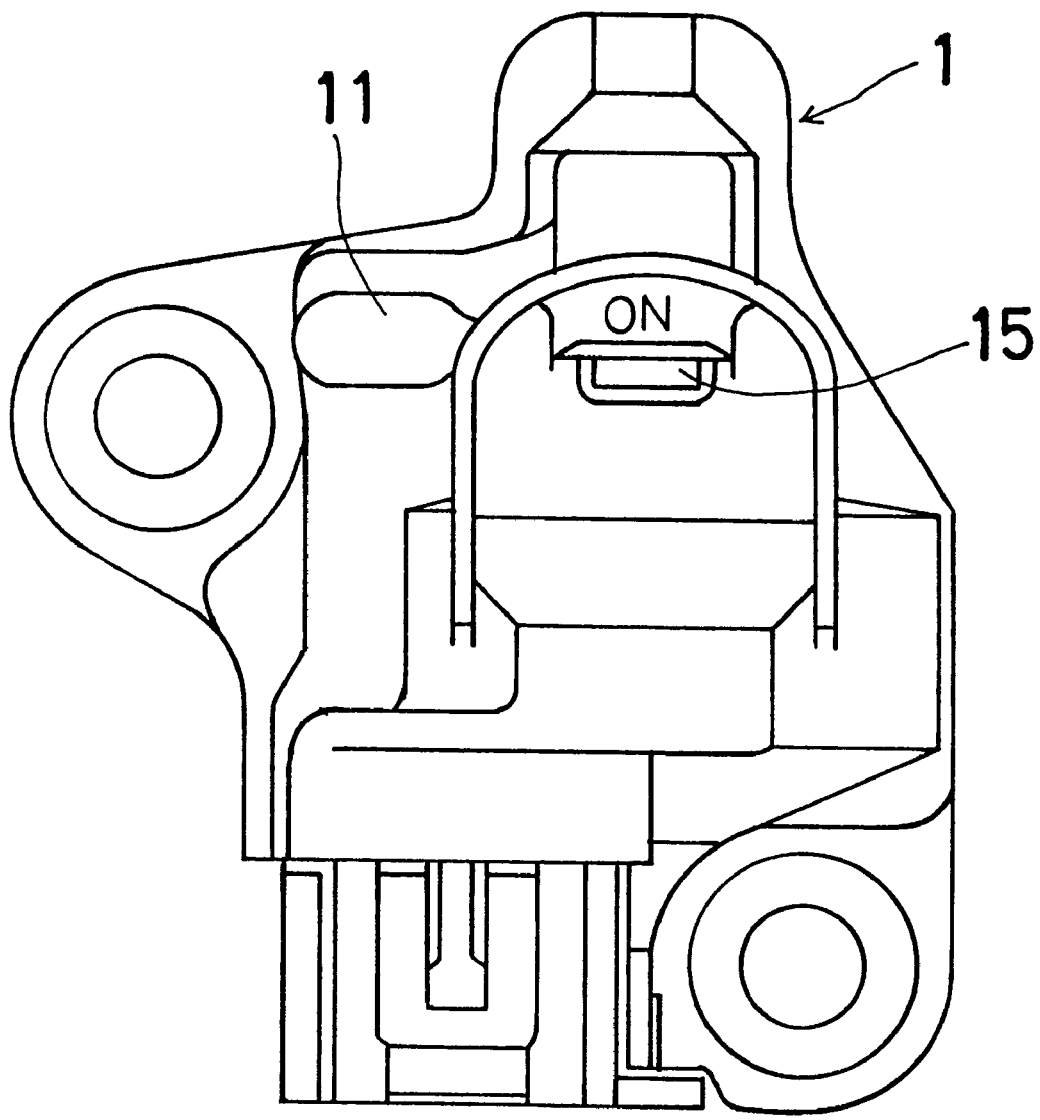
FIG. 10 is an outer elevational view of the impact detecting apparatus illustrated in FIG. 1.

Referring to FIGS. 9 and 10, the flange 64 of the shaft member 6 includes an arm portion 65 which extends outwardly towards the case 11. The tip of the arm portion 65 is attached to an indicator 15. The case 11 has a recessed portion or opening 11b in which is received the indicator 15. The indicator 15 moves with the shaft member 6 as a unit. The indicator 15 is located in the opening 11b of the case 11 when the impact detecting apparatus is in the initial state shown in FIG. 1 so that the indicator is hidden from view. The indicator 15 is moved out from the opening 11b to be exposed when the apparatus is in the state shown in FIG. 4. As a result, the condition of the impact detecting apparatus can be visually recognized from outside.

In addition, as seen with reference to FIG. 9, the rectangular portion 61 of the shaft member 6 includes a projection 66. The projection 66 is able to contact the under side of the connecting portion 72 of the lever member 7. Therefore, if the indicator 15 is lifted to the recessed portion 11b from the state shown in FIG. 4, both the shaft member 6 and the lever member 7 are lifted. Therefore, it is easy to return the apparatus to the initial state or condition shown in FIG. 1.

When the ball 3 starts moving along the surface of the conical slope 21a, the direction of the impact decides the moving direction of the ball 3. Because the conical slope 21a has a continuously varying gradient or slope along the entire circumference direction, impact values which are able to move the ball 3 can be set up at predetermined values in proportion to the angle of the gradient or slope.

In the above embodiment, the largest angle portion $21_{al}$ is located in the downward direction or downwardmost point as viewed with reference to FIG. 11. Therefore, if the ball 3 starts moving toward this direction, a large impact, whose direction is directed to the downward direction in FIG. 11, is needed such that the sensitivity of the impact apparatus is decreased. On the other hand, the smallest angle portion $21_{as}$ is located in the upward direction or upwardmost point as viewed with reference to FIG. 11 such that a small impact, whose direction is towards the upper direction in FIG. 11, is able to move the ball 3 and the sensitivity of the impact apparatus is increased. Accordingly, the different gradients or slope of the conical slope 21a can be determined as desired to set up suitable or desired sensitivities of the impact detecting apparatus. The impact detecting apparatus can have a varied directivity according to the slope of the recessed portion 21. It is thus possible to adjust the sensitivities based on the vehicle frame structure for collisions from different directions of the vehicle. In the preferred embodiment described above, the different gradients or slope of the conical slope 21a form a continuously varying slope or gradient about the entire circumference of the conical slope 21a.

Figure 15:
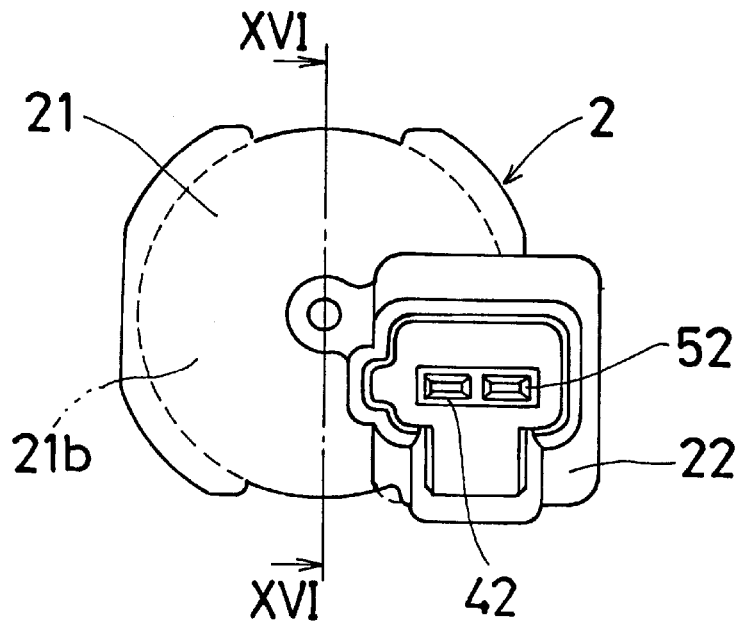
FIG. 15 is a view similar to FIG. 11 illustrating a second embodiment of the impact detecting apparatus in accordance with the present invention.
Figure 16:
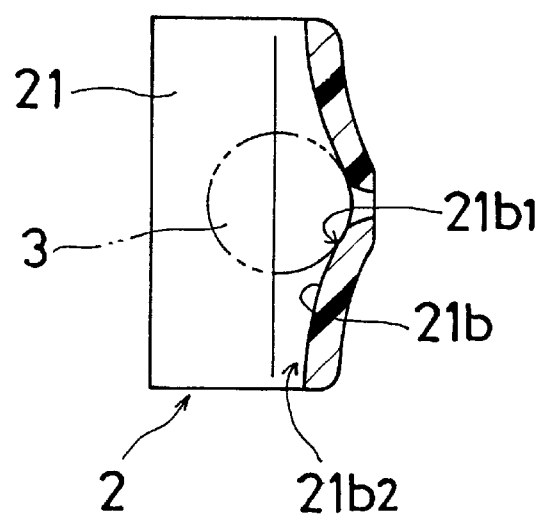
FIG. 16 is a cross-sectional view taken along the section line XVI—XVI in FIG. 15.

FIG. 15 and FIG. 16 illustrate a modified version of the first embodiment described above. This embodiment involves a modified arrangement of the conical slope 21b of the recessed portion 21. In FIGS. 15 and 16, the parts corresponding to those shown described above and shown in FIGS. 11–14 are identified with the same reference numerals as those used in FIGS. 11–14. In this modified construction illustrated in FIGS. 15 and 16, the conical slope 21b is angled at different angles along the radial direction of the conical slope 21b. As shown in FIG. 16, the radial outer side portion $21_{b2}$ of the conical slope 21b possesses a gentler slope than the holding portion $21_{b1}$ for the ball 3 such that the ball 3 is prevented from moving so as to decrease the sensitivity of the impact apparatus.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An impact detecting apparatus comprising:
   a housing;
   a fixed electrode located within the housing;
   a movable electrode located adjacent the fixed electrode for moving into and out of electrical engagement with the fixed electrode;
   a conical slope located within the housing, the conical slope having a continuously varying gradient along a circumferential direction of the conical slope;
   a ball located on the conical slope; and
   a shaft movably supported in the housing, said shaft being movable into and out of engagement with the ball to control a position of the movable electrode.

2. An impact detecting apparatus according to claim 1, further comprising a spring that applies an urging force to the shaft.

3. An impact detecting apparatus according to claim 2, further comprising a lever rotatably and slidably supported within the housing, said lever having one end that pushes the movable electrode toward the fixed electrode and an opposite end that contacts the shaft.

4. An impact detecting apparatus according to claim 3, wherein the conical slope has a first portion angled at a first slope and a second portion angled at a second slope, said first and second portions being located at diametrically opposite positions to one another.

5. An impact detecting apparatus according to claim 4, wherein the lever includes an engaging portion that engages the housing to restrict the lever from sliding.

6. An impact detecting apparatus according to claim 5, wherein the housing includes an engaging portion that is engaged by the engaging portion of the lever.

7. An impact detecting apparatus according to claim 4, wherein the ball is movable along the conical slope upon impact to move the ball out of engagement with the shaft, the shaft including a portion that engages an end portion of the lever when the ball is moved out of engagement with the shaft, and including a clearance provided between the lever and said portion of the shaft when the shaft engages the ball.

8. An impact detecting apparatus according to claim 4, wherein the housing includes a guide wall allowing the lever to slide so that the one end of the lever moves out of contact with the movable electrode when the shaft is out of engagement with the ball.

9. An impact detecting apparatus comprising:
   a housing having a wall that slopes outwardly from a central region, said wall sloping outwardly from the central region at different gradients along a circumferential extent of the wall;
   a fixed electrode located within the housing;
   a movable electrode positioned within the housing to be moved into and out of electrical engagement with the fixed electrode;
   a ball located in the housing and movable along the sloping wall; and
   a shaft movably supported in the housing and operatively associated with the movable electrode, said shaft engaging the ball to control a position of the movable electrode.

10. An impact detecting apparatus in claim 9, including a spring which applies an urging force to the shaft so that the spring urges the shaft in an axial direction.

11. An impact detecting apparatus in claim 9, wherein the wall has a largest gradient and a smallest gradient located at diametrically opposite positions to one another.

12. An impact detecting apparatus in claim 9, including a lever rotatably and slidably supported within the housing, said lever having one end that pushes the movable electrode toward the fixed electrode when the shaft engages the ball and an opposite end that contacts the shaft.

13. An impact detecting apparatus in claim 12, wherein the lever includes an engaging portion that engages an engaging surface of the housing to restrict the lever from sliding.

* * * * *